(12) United States Patent
Yamazaki

(10) Patent No.: US 8,263,980 B2
(45) Date of Patent: Sep. 11, 2012

(54) ACTIVE MATRIX SUBSTRATE, ELECTRO-OPTICAL DEVICE, AND ELECTRONIC APPARATUS

(75) Inventor: Yasushi Yamazaki, Azumino (JP)

(73) Assignee: Seiko Epson Corporation (JP)

( * ) Notice: Subject to any disclaimer, the term of this patent is extended or adjusted under 35 U.S.C. 154(b) by 146 days.

(21) Appl. No.: 12/832,151

(22) Filed: Jul. 8, 2010

(65) Prior Publication Data

US 2011/0024754 A1    Feb. 3, 2011

(30) Foreign Application Priority Data

Jul. 28, 2009    (JP) ................ 2009-175658

(51) Int. Cl.
*H01L 29/04* (2006.01)
(52) U.S. Cl. .................. 257/59; 257/E33.053
(58) Field of Classification Search ........ 257/59
See application file for complete search history.

(56) References Cited

U.S. PATENT DOCUMENTS

| 6,057,897 A * | 5/2000 | Ichikawa et al. ........... 349/48 |
| 6,624,857 B1 | 9/2003 | Nagata et al. |
| 2009/0102360 A1 * | 4/2009 | Kawakami et al. ........ 313/504 |
| 2011/0090006 A1 * | 4/2011 | Yamazaki et al. ......... 327/581 |

FOREIGN PATENT DOCUMENTS

| JP | 11-338376 | 12/1999 |
| JP | 2006-003920 | 1/2006 |
| JP | 2008-020772 | 1/2008 |

* cited by examiner

*Primary Examiner* — Thao P. Le
(74) *Attorney, Agent, or Firm* — Harness, Dickey & Pierce, P.L.C.

(57) ABSTRACT

An active matrix substrate including: a substrate; a display section having a pixel circuit formed on the substrate; and a protection circuit connected to an interconnection of the display section. The protection circuit has a diode-connected transistor, an insulating layer provided so as to cover the transistor, and a light-shielding layer provided in a region above the insulating layer so as to face at least a channel region in the transistor and electrically connected to at least any one of a gate electrode and a source electrode of the transistor.

7 Claims, 7 Drawing Sheets

ACTIVE MATRIX SUBSTRATE, ELECTRO-OPTICAL DEVICE, AND ELECTRONIC APPARATUS

BACKGROUND

1. Technical Field

The present invention relates to an active matrix substrate, an electro-optical device, and an electronic apparatus.

2. Related Art

In an electro-optical device such as a liquid crystal device, a configuration is widely known, in which a test circuit and a protection circuit are provided on a substrate and in which a light-shielding film is formed to prevent the entrance of light into the test circuit and the protection circuit.

For example, in a liquid crystal device disclosed in JP-A-11-338376, a test circuit is formed on one substrate, and a black matrix is formed on another substrate so as to cover the test circuit in a plan view. In a liquid crystal device disclosed in JP-A-2008-20772, a protection circuit is formed on one substrate, and a black matrix is formed on another substrate so as to cover the protection circuit. In a liquid crystal device disclosed in JP-A-2006-3920, a test circuit is formed on one substrate, and a light-shielding film is formed between the test circuit and another substrate.

Unfortunately, in the techniques disclosed in JP-A-11-338376 and JP-A-2008-20772, because the black matrix formed on one substrate shields the circuit formed on another substrate from the entrance of light, sufficient ability to shield the circuit from the entrance of light is incapable of being achieved in the case where there is a relative displacement between the pair of substrates and in the case of the entrance of light in an oblique direction, and leakage current is therefore increased in the circuit. Consequently, disadvantages of increased power consumption and defects in display are generated. In addition, such techniques are incapable of being applied to an electro-optical device, such as an organic electro luminescence (EL) device and an electrophoretic device, in which a counter substrate is not provided with a black matrix thereon.

Furthermore, with the technique disclosed in JP-A-2006-3920, although the ability to shield a circuit from the entrance of light is sufficient on a side which is provided with the light-shielding film, the entrance of light from the opposite side of the substrate is not taken in consideration at all.

SUMMARY

An advantage of some aspects of the invention is that it provides an active matrix substrate that includes a protection circuit having an excellent light-shielding property and that is capable of being included in an electro-optical device with high display quality, and that it provides an electro-optical device having excellent display quality.

According to an aspect of the invention, there is provided an active matrix substrate including a base substrate, a display section having a pixel circuit formed on a substrate, and a protection circuit connected to an interconnection of the display circuit. The protection circuit has a diode-connected transistor, an insulating layer provided so as to cover the transistor, and a light-shielding layer provided in a region above the insulating layer so as to face at least a channel region in the transistor and electrically connected to at least any one of a gate electrode and a source electrode of the transistor.

By virtue of this advantage, because the light-shielding layer is formed in a region above the insulating layer so as to face the channel region in the transistor, the entrance of light into the protection circuit from a side opposite to the substrate is capable of being effectively excluded. Consequently, a leak current due to the entrance of light is suppressed, leading to producing an active matrix substrate being able to be included in an electro-optical device with low power consumption and high display quality.

Because a black matrix for shielding the protection circuit from light is not employed in a counter substrate used along with the active matrix substrate, the alignment between such a black matrix and the protection circuit is accordingly excluded, so that there is provided the active matrix substrate that enables an electro-optical device to be produced in an easy process.

It is preferable that the light-shielding layer has an extension portion extending outward from the transistor and that the extension portion forms a capacitive device along with a conductive member connected to at least any one of the gate electrode and the source electrode of the transistor and with the insulating layer.

By virtue of this advantage, because the light-shielding layer and the conductive member (interconnection or electrode, for example) are capable of being used to form a capacitive device, the protection circuit is capable of being efficiently provided with the capacitive device.

It is preferable that the light-shielding layer is composed of a light reflective metallic film and that the metallic film is connected to the gate electrode or the source electrode through a transparent conductive layer laminated on the metallic film.

By virtue of this advantage, an interconnection layer composed of a light-reflective metallic film and another interconnection layer composed of a transparent conductive film, which are both typically used in a pixel formation region in the active matrix substrate, are capable of being used to form the protection circuit. Furthermore, because the light-shielding layer composed of the metallic film is connected to the gate or source electrode through the transparent conductive film, instability of potential in the light-shielding layer is capable of being precluded. Moreover, the light-reflective metallic film is not suitable for a contact between the interconnection layers, and the metallic film should be coated with other metallic materials in cases where the metallic film is used as a contact. However, according to an aspect of the invention, the transparent conductive film is used as the contact between the interconnection layers to be connected to the light-shielding layer, so that coating of the light reflective metallic film with other metallic films is excluded. Consequently, there is provided the active matrix substrate that enables an electro-optical device to be produced in an easy process.

It is preferable that the transistor has an inversely staggered configuration and that the insulating layer includes an organic insulating film at least above the channel region.

By virtue of this advantage, the gate electrode is capable of shielding the channel region in the transistor from light that enters from a side of the substrate, leading to more steadily shielding the transistor from light. On the other hand, in the inversely staggered configuration, because the channel region is positioned so as to face the light-shielding layer with interposing the insulating layer therebetween, the light-shielding layer serves as the gate electrode to affect the channel region when voltage is applied to the light-shielding layer, so that a threshold voltage in the protection circuit may be decreased. However, according to an aspect of the invention, because the organic insulating film is formed above the channel region, a voltage in the light-shielding layer is capable of being made to reduce functioning as a gate voltage.

It is preferable that the insulating layer above the channel region has a laminate structure including inorganic and organic insulating films, whereas the insulating layer in the region provided with the extension portion is composed of an only inorganic insulating film.

By virtue of this advantage, the decrease of the threshold voltage in the transistor is capable of being effectively excluded, and capacitance of the capacitive device formed in the extension portion is able to be increased.

It is preferable that the protection circuit is provided with a capacitive device having an electrode connected to the gate electrode of the transistor, an electrode connected to the source electrode of the transistor, and an insulating film formed by extending a gate insulating film of the transistor.

By virtue of this advantage, the protection circuit is capable of operating on the basis of a capacity ratio of parasitic capacitance in the capacitive device and the transistor from a stage in which the source and gate electrodes of the transistor are not connected to each other in a manufacturing process. Consequently, there is provided a protection circuit which is capable of protecting a pixel circuit at an early stage in the manufacturing process.

According to another aspect of the invention, there is provided an electro-optical device including the active matrix substrate having the above advantages.

By virtue of this advantage, an electro-optical device with high display quality is capable of being provided.

According to another aspect of the invention, there is provided an electronic apparatus including the electro-optical device having the above advantages.

By virtue of this advantage, an electronic apparatus having a display section with high display quality is capable of being provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
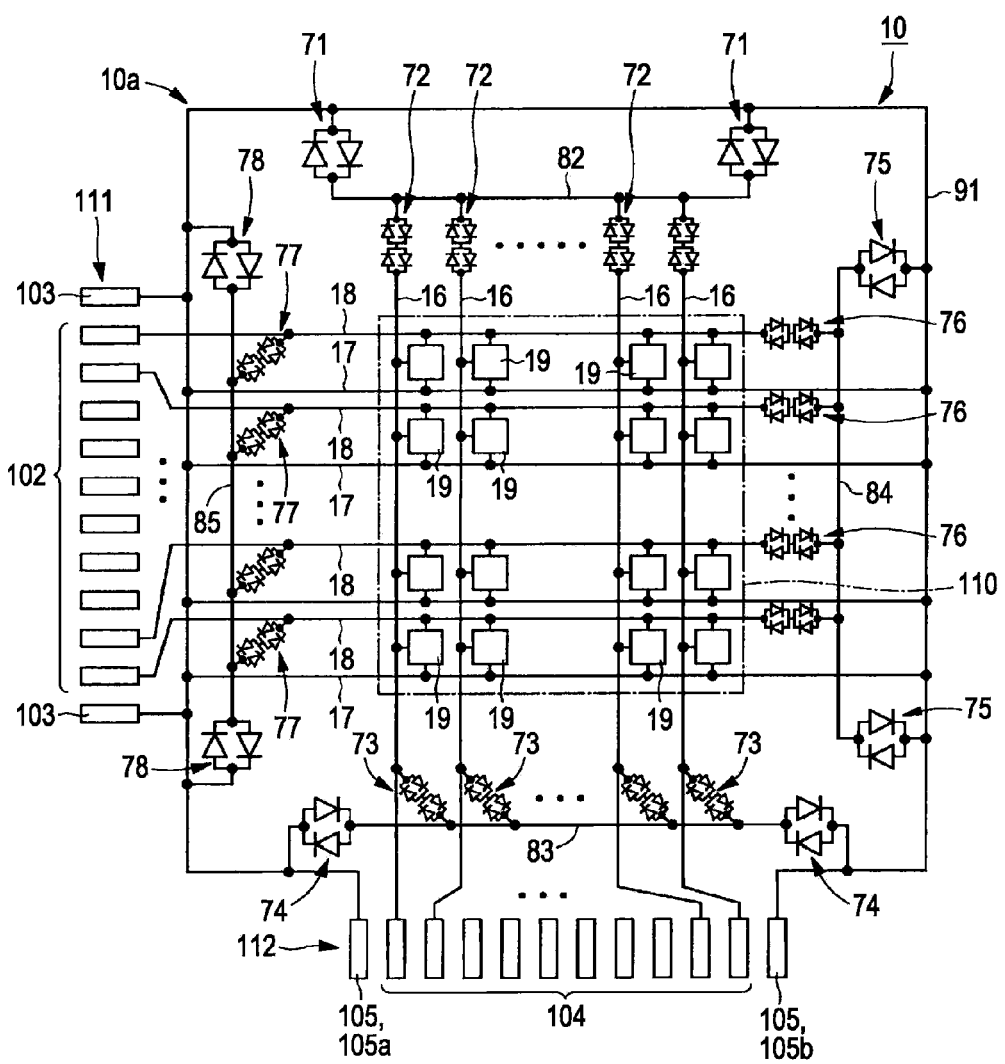
FIG. 1 is a circuit diagram illustrating the electrical configuration of an active matrix substrate according to an embodiment of the invention.

An active matrix substrate, an electro-optical device, and an electronic apparatus according to an embodiment of the invention will be hereinafter described with reference to the accompanying drawings. However, the scope of the invention is not limited to the following embodiments and is can be suitably modified without departing from the spirit of the invention. In addition, for the purpose of simplifying illustration, the size and number of each component in the drawings may be different from those of actual components.

Active Matrix Substrate

Figure 2:
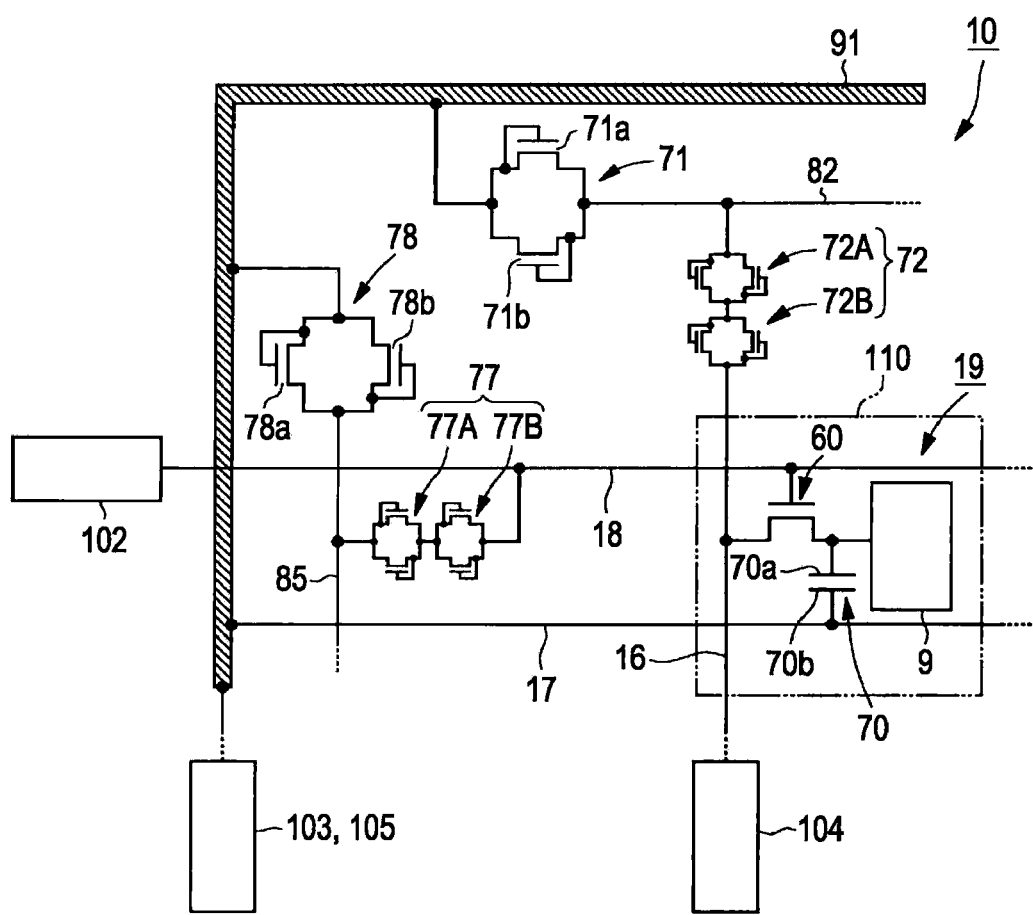
FIG. 2 is a circuit diagram partially illustrating the configuration in FIG. 1 in detail.

FIG. 1 is a circuit diagram illustrating the electrical configuration of an active matrix substrate 10 according to an embodiment of the invention. FIG. 2 is a circuit diagram illustrating a region 10a in FIG. 1 in more detail.

The active matrix substrate 10 includes a pixel formation region 110 in which a plurality of pixels 19 are arranged in a matrix, a shielding wire 91 provided in a substantially rectangular frame-like shape so as to surround the pixel formation region 110, a first terminal region 111 provided along a side of the rectangular shape of the shielding wire 91, and a second terminal region 112 provided along another side of the rectangular shape of the shielding wire 91, the other side being adjacent to the side along which the first terminal 111 is provided.

In the pixel formation region 110, the plurality of pixels 19 are arranged in a matrix in a plan view. Each of plural data lines 16, plural capacitor lines 17, and plural scanning lines 18 extends in the pixel formation region 110 such that the data lines 16 intersect the capacitor lines 17 and the scanning lines 18. The capacitor lines 17 extend in a direction parallel to the scanning lines 18. The pixels 19 are individually disposed in the vicinity of the intersections of the data lines 16 and the scanning lines 18. Each of the pixels 19 is connected to the corresponding data line 16, capacitor line 17, and scanning line 18.

As illustrated in FIG. 2, each of the pixel 19 which is formed in the pixel formation region 110 is provided with a thin film transistor (TFT) 60, a pixel electrode 9 connected to a drain electrode of the TFT 60, and a storage capacitor 70, one electrode (capacitor electrode 70a) of which is connected between the TFT 60 and the pixel electrode 9. The data line 16 through which an image signal is transmitted is connected to a source electrode of the TFT 60. The scanning line 18 is connected to a gate electrode of the TFT 60. Another electrode (capacitor electrode 70b) of the storage capacitor 70 is connected to the capacitor line 17.

Returning to FIG. 1, the data lines 16 extend to outside the pixel formation region 110. One end of each of the data lines 16 is connected to an external connection terminal 104. Another end of each of the data lines 16 extends in a direction toward an edge on the opposite side to the external connection terminal 104 and is connected to a corresponding protection circuit 72. The protection circuits 72 are also connected to a common line 82. The two ends of the common line 82 are individually connected to protection circuits 71, and the protection circuits 71 are also connected to the shielding wire 91.

Each of the data lines 16 is connected to a corresponding protection circuit 73 at a portion near the external connection terminal 104. The protection circuits 73 are also connected to a common line 83. The two ends of the common line 83 are individually connected to protection circuits 74, and the protection circuits 74 are also connected to the shielding wire 91.

The scanning lines 18 extend to outside the pixel formation region 110. One end of each of the scanning lines 18 is connected to an external connection terminal 102. Another end of each of the scanning lines 18 extends in a direction toward an edge on the opposite side to the external connection terminal 102 and is connected to a corresponding protection circuit 76. The protection circuits 76 are also connected to a common line 84. The two ends of the common line 84 are individually connected to protection circuits 75, and the protection circuits 75 are also connected to the shielding wire 91.

Each of the scanning lines 18 is connected to a corresponding protection circuit 77 at a portion near the external connection terminal 102. The protection circuits 77 are also connected to a common line 85. The two ends of the common line 85 are individually connected to protection circuits 78, and the protection circuits 78 are also connected to the shielding wire 91.

The capacitor lines 17 extend outside to the pixel formation region 110 in a direction parallel to the scanning lines 18. The two ends of the individual capacitor lines 17 are connected to the shielding wire 91. The shielding wire 91 is also connected to external connection terminals 103 and 105. Voltage is capable of being applied through the external connection terminals 103 and 105.

In the embodiment, the shielding wire 91 extends from one external connection terminal 105 (105a) to another external connection terminal 105 (105b) so as to surround the pixel formation region 110. In the vicinity of each of the external connection terminals 105, the shielding wire 91 is connected to the protection circuits 74, and the protection circuits 74 are also connected to the common line 83. The shielding wire 91, the common lines 82 to 85, and the respective protection circuits 71, 74, 75, and 78 connected to the two ends of the respective common lines respectively form circuits, and the circuits are positioned so as to surround the pixel formation region 110.

Subsequently, the protection circuits 71 to 78 will be described with reference to FIG. 2.

With reference to FIG. 2, the protection circuit 71 has first and second diodes 71a and 71b, which are diode-connected metal-oxide semiconductor (MOS) transistors and which are reversely connected to each other in parallel. More specifically, an anode of the first diode 71a and a cathode of the second diode 71b are connected to the shielding wire 91, and a cathode of the first diode 71a and an anode of the second diode 71b are connected to the common line 82. The protection circuit 78 also has first and second diodes 78a and 78b and is interposed between the shielding wire 91 and the common line 85 in a similar manner.

Although FIG. 2 illustrates only the protection circuits 71 and 78, each of the protection circuit 74 interposed between the shielding wire 91 and the common line 83 and the protection circuit 75 interposed between the shielding wire 91 and the common line 84 also has a configuration the same as that of the protection circuits 71 and 78.

On the other hand, the protection circuit 72 has unit circuits 72A and 72B which are connected to each other in series, and in each of the unit circuits 72A and 72B, two diodes are inversely connected to each other in parallel. The unit circuit 72A is connected to the common line 82. The unit circuit 72B is connected to the data line 16. The protection circuit 77 also has unit circuits 77A and 77B which are connected to each other in series and is interposed between the common line 85 and the scanning line 18 in a similar manner.

Each of the unit circuits 72A, 72B, 77A, and 77B has a circuit configuration the same as that of the protection circuit 71. However, because the protection circuit 72 is provided with respect to one data line 16, a transistor included in the unit circuit 72A is smaller in width and length than that included in the protection circuit 71.

Although FIG. 2 illustrates only the protection circuits 72 and 77, each of the protection circuit 73 interposed between the data line 16 and the common line 83 and the protection circuit 76 interposed between the scanning line 18 and the common line 84 has a configuration the same as that of the protection circuits 72 and 77.

Current and voltage characteristics of each of the protection circuits 71 to 78 having the above described configuration exhibit nonlinearity in both directions. In other words, in each of the protection circuits, each diode exhibits high impedance during the application of low voltage and exhibits low impedance during the application of high voltage to discharge static electricity to the common lines 82 to 85 and the shielding wire 91. Consequently, the TFT 60 in the pixel formation region 110 is protected from static electricity.

In the embodiment, because each of the diodes substantially functions as a transistor, the diodes have the high ability to discharge static electricity. Consequently, the diodes are capable of quickly absorbing static electricity to achieve a high protective ability with respect to static electricity.

Subsequently, a specific example of each of the protection circuits 71 to 78 will be described with reference to the protection circuit 71 illustrated in FIGS. 3 and 4.

Figure 3:
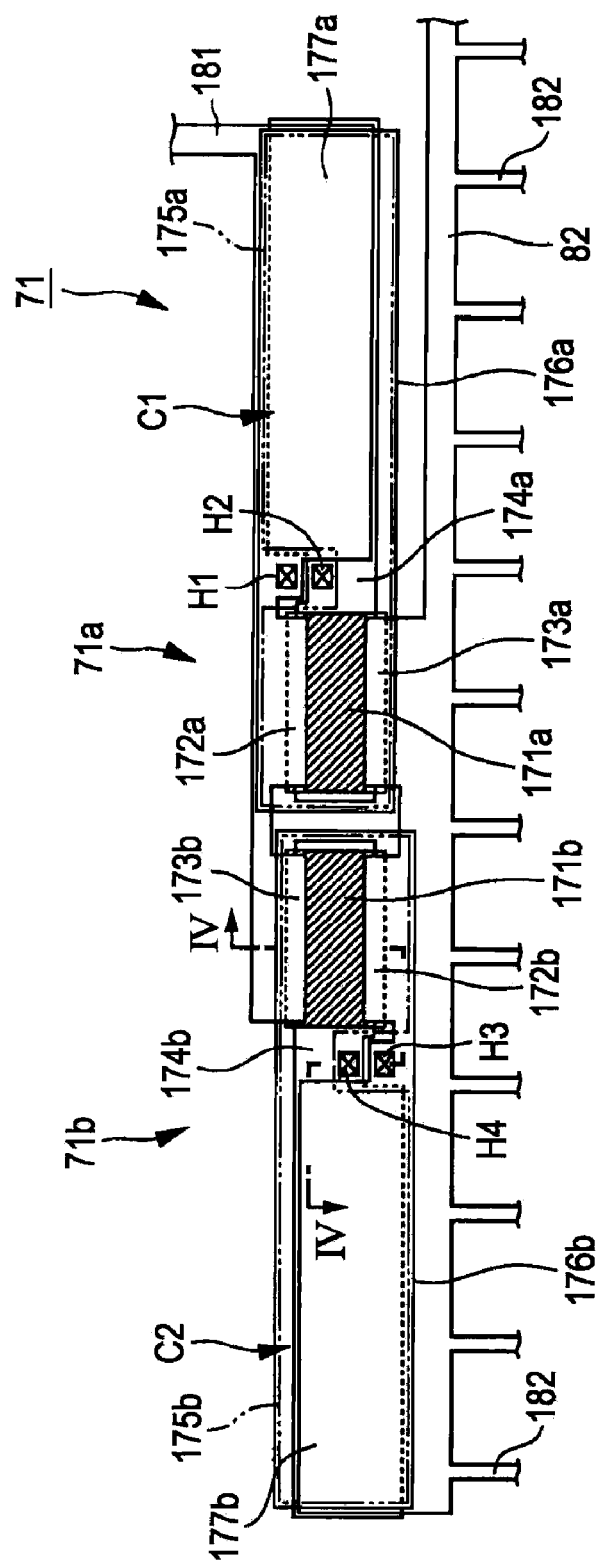
FIG. 3 is a plan view illustrating a protection circuit according to the embodiment of the invention.

FIG. 3 is a plan view illustrating the protection circuit 71. FIG. 4 is a cross sectional view illustrating the active matrix substrate 10 taken along a line V-V' in FIG. 3.

Figure 4:
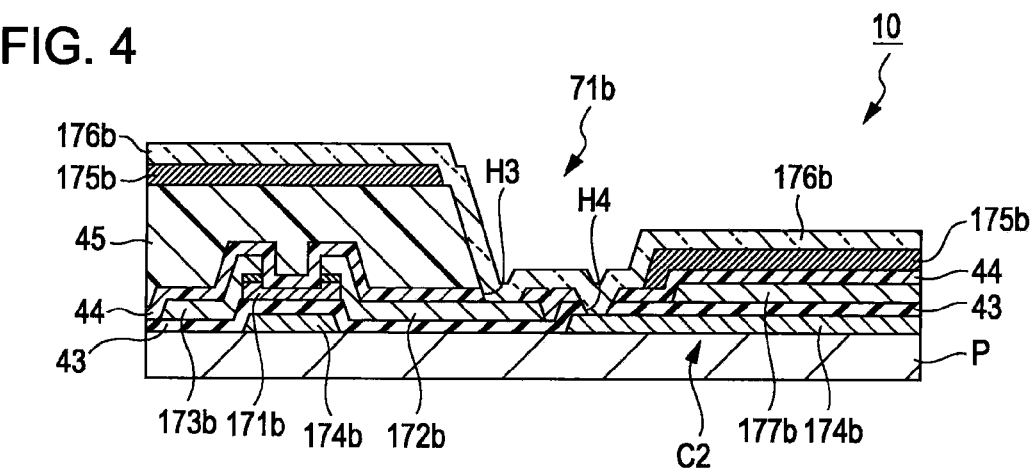
FIG. 4 is a cross-sectional view illustrating the active matrix substrate taken along a line V-V' in FIG. 3.

The protection circuit 71 illustrated in FIGS. 3 and 4 has the first and second diodes 71a and 71b, in each of which a TFT is short-circuited between source and drain electrodes. The first and the second diodes 71a and 71b are reversely connected to each other. The protection circuit 71 is connected to an interconnection 181 and the common line 82. The interconnection 181 is connected to the shielding wire 91 (see FIG. 2). The common line 82 is connected to the protection circuit 72 (see FIG. 2) through an interconnection 182.

The first diode 71a includes a substrate P, a gate electrode 174a disposed on the substrate P, a semiconductor layer 171a provided above the gate electrode 174a, a source electrode 172a and a drain electrode 173a which are connected to the semiconductor layer 171a, a light-shielding layer 175a, and a transparent electrode 176a connected to the source electrode 172a and the gate electrode 174a.

The source electrode 172a is connected to the interconnection 181 through a capacitor electrode 177a having a substantially rectangular shape in a plan view and is also connected to a drain electrode 173b (will be described hereinafter) of the second diode 71b. The capacitor electrode 177a is formed in a region overlapping the gate electrode 174a in a plan view to form a capacitive device C1 along with the gate electrode 174a. The drain electrode 173a is connected to the common line 82 and is also connected to a source electrode 172b of the second diode 71b.

The transparent electrode 176a is connected to the source electrode 172a and the gate electrode 174a through respective contact holes H1 and H2 to short-circuit the source electrode 172a and the gate electrode 174a. The transparent electrode 176a and the light-shielding layer 175a are provided so as to cover the semiconductor layer 171a in a plan view and extend to a region in which the capacitor electrode 177a is covered in a plan view. A portion that covers the capacitor electrode 177a is an extension portion of the light-shielding layer 175a.

The first diode 71b includes a substrate P, a gate electrode 174b disposed on the substrate P, a semiconductor layer 171b provided above the gate electrode 174b, a source electrode 172b and a drain electrode 173b which are connected to the semiconductor layer 171b, a light-shielding layer 175b, and a transparent electrode 176b connected to the source electrode 172b and the gate electrode 174b.

The source electrode 172b is connected to the common line 82 through a capacitor electrode 177b having a substantially rectangular shape in a plan view and is also connected to a drain electrode 173a of the first diode 71a. The capacitor electrode 177b is formed in a region overlapping the gate electrode 174b in a plan view to form a capacitive device C2 along with the gate electrode 174b. The drain electrode 173b is connected to the source electrode 172a of the first diode 71a.

The transparent electrode 176b is connected to the source electrode 172b and the gate electrode 174b though respective contact holes H3 and H4 to short-circuit the source electrode 172b and the gate electrode 174b. The transparent electrode 176b and the light-shielding layer 175b are provided so as to cover the semiconductor layer 171b in a plan view and extend to a region in which the capacitor electrode 177b is covered in a plan view. A portion that covers the capacitor electrode 177b is an extension portion of the light-shielding layer 175b.

With reference to a cross section structure illustrated in FIG. 4, the gate electrode 174b is formed on the substrate P, and a gate insulating layer 43 is provided so as to cover the gate electrode 174b. In a left portion of FIG. 4, the semiconductor layer 171b (amorphous silicon layer or $N^+$ silicon layer) is disposed on the gate insulating layer 43 at a position in which the gate electrode 174b is covered in a plan view. The source electrode 172b and the drain electrode 173b are provided so as to ride up on each of the two ends of the semiconductor layer 171b. A passivation layer 44 is disposed so as to cover the source electrode 172b and the drain electrode 173b. In a right portion of FIG. 4, the capacitor electrode 177b is disposed on the gate insulating layer 43 at a position in which the gate electrode 174b covers in a plan view. The capacitive device C2 is formed in such a position. The passivation layer 44 is disposed on the capacitor electrode 177b.

A planarizing layer 45 is composed of an organic material such as an acrylic resin and is disposed on the passivation layer 44 so as to cover the semiconductor layer 171b. The light-shielding layer 175b is composed of aluminum and silver and is provided on the planarizing layer 45 disposed on the passivation layer 44. The transparent electrode 176b is composed of a transparent material such as an indium tin oxide (ITO) and is disposed on the light-shielding layer 175b so as to cover the layer 175b.

In a region in which the light-shielding layer 175b is not formed, the contact hole H3 is formed so as to penetrate through the passivation layer 44 to the source electrode 172b, and the contact hole H4 is formed so as to penetrate through the passivation layer 44 and the gate insulating layer 43 to the gate electrode 174b. The transparent electrode 176b is connected to the source electrode 172b and the gate electrode 174b through the contact holes H3 and H4.

In the embodiment, the planarizing layer 45 is not formed on the passivation layer 44 in a region in which the capacitive device C2 is formed. The light-shielding layer 175b and the transparent electrode 176b are laminated on the passivation layer 44. This embodiment enables capacitance to come to be larger, the capacitance being produced by the light-shielding layer 175b, the passivation layer 44, and the capacitor electrode 177b in the capacitive device C2.

In the embodiment, although the protection circuit 71 has been illustrated and described, a configuration the same as that illustrated in FIGS. 3 and 4 is capable of being employed in the other protection circuits 72 to 78.

Figure 5:
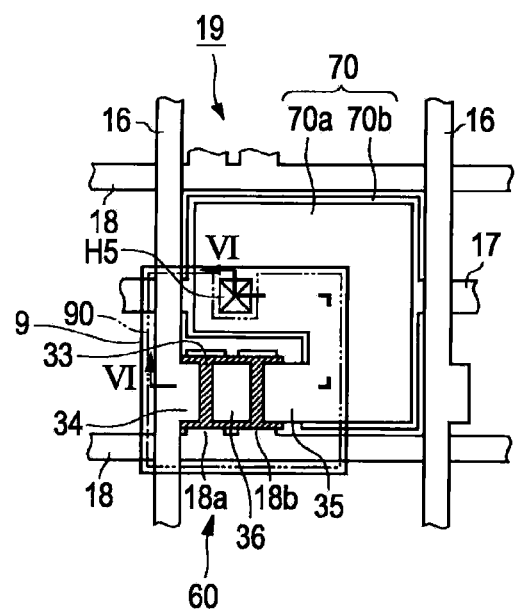
FIG. 5 is a plan view illustrating a pixel in the active matrix substrate.
Figure 6:
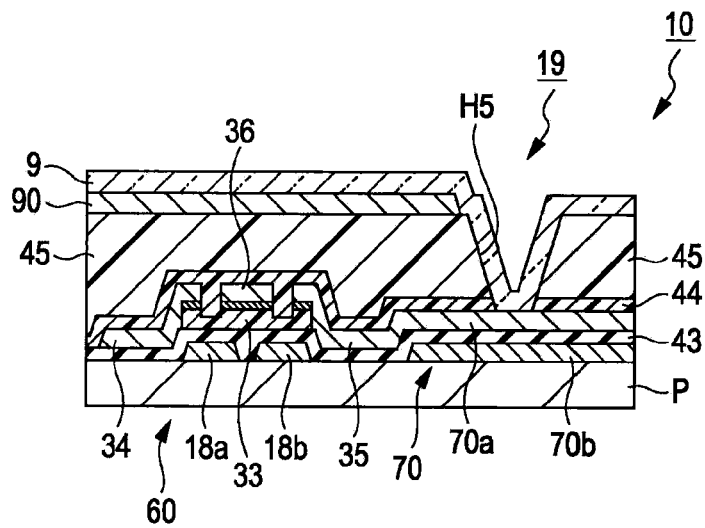
FIG. 6 is a cross-sectional view illustrating the active matrix substrate taken along a line VII-VII' in FIG. 5.

FIGS. 5 and 6 illustrate the configuration of a pixel in the active matrix substrate 10. FIG. 5 is a plan view illustrating one pixel in the active matrix substrate 10. FIG. 6 is a cross sectional view illustrating the active matrix substrate 10 taken along a line VII-VII' in FIG. 5.

With reference to FIG. 5, in the pixel formation region in the active matrix substrate 10, a plurality of the scanning lines 18 and the data lines 16 extend so as to intersect each other. In FIG. 5, two adjacent scanning lines 18 and two adjacent data lines 16 surround a rectangular shaped region in a plan view to form a pixel region (pixel 19).

The pixel 19 is provided with the pixel electrode 9, which is a substantially rectangular shape in a plan view and composed of a transparent conductive material such as an ITO, a reflecting electrode 90 composed of metal having reflectivity, such as aluminum, and the TFT 60 connected to the pixel electrode 9 through the storage capacitor 70.

The TFT 60 includes a substrate P, gate electrodes 18a and 18b disposed on the substrate P, a semiconductor layer 33 composed of amorphous silicon (a-Si) and provided above the gate electrodes 18a and 18b, a source electrode 34, a drain electrode 35, and a connection electrode 36, each electrode 34 to 36 being disposed on the semiconductor layer 33.

Part of the individual scanning lines 18 is branched to the pixel electrode 9 to form the gate electrodes 18a and 18b. The semiconductor layer 33 is provided so as to cover the gate electrodes 18a and 18b. Part of the individual data lines 16 is branched in a direction parallel to the scanning line 18 to form the source electrode 34. The source electrode 34 is connected to the source region of the semiconductor layer 33. One end of the drain electrode 35 is connected to the drain region of the semiconductor layer 33, and another end thereof is connected to the capacitor electrode 70a. The rectangular shape of the connection electrode 36 is provided above the gate electrodes 18a and 18b in a region between the electrodes 18a and 18b and enables transistors to be connected to each other, the transistors being formed with respect to each of the gate electrodes 18a and 18b.

In the above described pixel 19, the TFT 60 is turned on during a predetermined period by a selection signal transmitted through the scanning lines 18, so that an image signal transmitted through the data lines 16 is written in the pixel electrode 9 through the storage capacitor 70.

The storage capacitor 70 is a capacitive device including the capacitor electrodes 70a and 70b formed in the pixel formation region and being substantially L-shaped in a plan view and including an insulating layer (gate insulating layer) disposed between the two capacitor electrodes 70a and 70b. The capacitor electrode 70a is connected to the drain electrode 35 of the TFT 60 and is also connected to the pixel electrode 9 through a contact hole H5. The capacitor electrode 70b is connected to a capacitor line 17 extending in parallel with the scanning line 18.

With reference to a cross sectional structure illustrated in FIG. 6, the gate electrodes 18a and 18b and the capacitor electrode 70b are disposed on a substrate P. The gate insulating layer 43 is provided so as to cover the gate electrodes 18a and 18b and the capacitor electrode 70b. The semiconductor layer 33 is disposed on the gate insulating layer 43 at a position above the gate electrodes 18a and 18b. Part of the source electrode 34, part of the drain electrode 35, and the capacitor electrode 70a are disposed on the gate insulating layer 43. The residual parts of the source electrode 34 and the drain electrode 35 are individually disposed on two ends of the semiconductor layer 33. The connection electrode 36 is disposed on the semiconductor layer 33. A passivation layer 44 is provided so as to cover the TFT 60 and the storage capacitor 70 having the above configuration. A planarizing layer 45 is disposed on the passivation layer 44. A reflecting electrode 90 is disposed on a planarizing layer 45. The pixel electrode 9 is disposed on the reflecting electrode 90. The pixel electrode 9 is connected to the capacitor electrode 70a through the contact hole H5 penetrating through the planarizing layer 45 and the passivation layer 44 to the capacitor electrode 70a.

Comparing the structure of the protection circuit 71 illustrated in FIG. 4 with that of the pixel 19 illustrated in FIG. 6, a position of the layer including the gate electrode 174b (174a) in the protection circuit 71 corresponds to a position of the layer including the gate electrodes 18a and 18b in the TFT 60. A position of the layer including the source electrode 172b (172a), the drain electrode 173b (173a), and the capacitor electrode 177b (177a) in the protection circuit 71 also corresponds to a position of the layer including the source electrode 34 (data line 16), the drain electrode 35, and the capacitor electrode 70a in the TFT 60. Furthermore, a position of the layer including the light-shielding layer 175b (175a) in the protection circuit 71 also corresponds to a position of the layer including the reflecting electrode 90 in the pixel 19. A position of the layer including the transparent electrode 176b (176a) in the protection circuit 71 also corresponds to a position of the layer including the pixel electrode 9 in the pixel 19.

Accordingly, in production processes of the active matrix substrate 10, the protection circuit 71 of the embodiment is capable of being simultaneously produced in a process the same as that in the production of the pixel 19 in the pixel formation region 110.

In the active matrix substrate 10 of the above embodiment, the first diode 71a and the second diode 71b included in the protection circuit 71 connected between the TFT 60 and the shielding wire 91 are respectively provided with the light-shielding layers 175a and 175b that cover channel regions in the semiconductor layers 171a and 171b in a plan view. By virtue of this advantage, alone the active matrix substrate 10 is capable of shielding the protection circuit 71 from the entrance of light. Consequently, leakage current due to the entrance of light is suppressed, so that an electro-optical device with low power consumption and high display quality is capable of being configured.

Especially, the active matrix substrate 10 of the embodiment is capable of being preferably used in an electro-optical device (for example, an organic EL device and an electrophoretic display device) in which a counter substrate to be attached to the active matrix substrate 10 does not have a black matrix. Even in cases where the active matrix substrate 10 is attached to a counter substrate having a black matrix, the alignment of the black matrix with the protection circuits 71 to 78 is excluded, so that a defect in light shielding due to the misalignment between the substrates is precluded. Furthermore, because a channel region in the transistor included in each of the protection circuits 71 to 78 is disposed so as to be adjacent to the light-shielding layer, light that enters into the protection circuits 71 to 78 in an oblique direction (a direction for making an angle of exceeding 0° to below 90° with a normal line of a principle surface of the substrate) is certainly capable of being blocked.

In the embodiment, the light-shielding layer 175a (175b) is provided in a layer disposed at a position corresponding to a position of the layer including the reflecting electrode 90 in the TFT 60 and is selectively disposed on the planarizing layer 45 above the semiconductor layer 171a (171b) without being formed inside the contact holes H3 and H4. By virtue of this configuration, the source electrode is more easily connected to the gate electrode in each of the first diode 71a and the second diode 71b.

Because a metal film, such as an aluminum or silver film, which is a component of the light-shielding layer 175a (175b) and has light reflectivity, is not suitable for connection between wiring layers, a surface of the metal film composed of aluminum or silver should be covered with molybdenum, tungsten, or a titanium nitride in cases where the light-shielding layer 175a (175b) composed of such metal is made to be connected to the source electrode 172a (172b) and the gate electrode 174a (174b).

However, in the embodiment, the light-shielding layer 175a (175b) is selectively disposed above the semiconductor layer 171a (171b). The transparent electrode 176a (176b) laminated on the light-shielding layer 175a (175b) enables the source electrode 172a (172b) to be connected to the gate electrode 174a (174b). Consequently, the metal film that is a component of the light-shielding layer 175a (175b) and has the light reflectivity should not be provided with a layer composed of molybdenum or the like, so that the active matrix substrate 10 is capable of being produced in an easy process.

The light-shielding layer 175a (175b) is positioned apart from the semiconductor layer 171a (171b) with interposing the planarizing layer 45 therebetween. In the embodiment, the light-shielding layer 175a (175b) is connected to the source electrode 172a (172b) and the gate electrode 174a (174b) through the transparent electrode 176a (176b) such that a potential in the light-shielding layer 175a (175b) does not come to be uncertain (floating potential). Consequently, in cases where voltage is applied through the shielding wire 91 to the protection circuit 71 at the operation thereof, the light-shielding layer 175a (175b) functions as a gate electrode of the TFT 60 at a position covering the semiconductor layer 171a (171b).

However, because a gate voltage applied from the light-shielding layer 175a (175b) decreases a threshold voltage of each of the first diode 71a and the second diode 71b, such voltage is not preferable in terms of the operation of the protection circuit 71. Accordingly, in the embodiment, the planarization layer 45 the same as that of the pixel 19 is provided above the semiconductor layer 171a (171b), and the light-shielding layer 175a (175b) is disposed on such a planarizing layer 45 to decrease the application of the gate voltage from the light-shielding layer 175a (175b).

In the embodiment, because each of the first diode 71a and the second diode 71b has an inversely staggered configuration in which the respective gate electrodes 174a and 174b is provided between the respective semiconductor layers 171a and 171b and a corresponding substrate P, the gate electrodes 174a and 174b are respectively capable of blocking light that enters into the first diode 71a and the second diode 71b from a side of the substrate P.

In cases where each of the first diode 71a and the second diode 71b has a staggered configuration, the wiring layer between the respective semiconductor layers 171a and 171b and a corresponding substrate P may be separately provided with a light-shielding layer.

The protection circuit 71 of the embodiment includes the first diode 71a and the second diode 71b which are inversely connected to each other and is connected to the capacitive device C1 (C2) of which the capacitor electrode 177a (177b) and a gate electrode 174a (174b) function as electrodes.

Typically, a diode in which a TFT is short-circuited between a source electrode and a gate electrode does not operate as a protection circuit unless the source electrode and the gate electrode are connected to each other. However, in the protection circuit 71 illustrated in FIGS. 3 and 4, even though the transparent electrodes 176a and 176b are not provided, the first diode 71a is capable of operating owing to a capacitance ratio of parasitic capacitance between the capacitive device C1 and the TFT 60, and the second diode 71b is capable of operating owing to a capacitance ratio of parasitic capacitance between the capacitive device C2 and the TFT 60.

Namely, in cases where the protection circuit 71 and the pixel 19 are simultaneously produced in the same process, each of the first diode 71a and the second diode 71b of the protection circuit 71 is capable of operating as a protection circuit on the basis of the above described capacitance ratio in so far as a wiring layer for connecting the source electrode 172a (172b), the drain electrode 173a (173b), and the capacitor electrode 177a (177b) to one another is formed even if the source electrode is not connected to the gate electrode through the transparent electrode 176a (176b). Consequently, the protection circuit is capable of operating once the TFT 60 has been formed in the pixel formation region 110, so that the TFT 60 is capable of being effectively protected.

Electro-Optical Device

A plurality of the configurations of an electro-optical device according to the embodiment of the invention will be described with reference to FIGS. 7A to 7C.

Electrophoretic Display Device

Figure 7A:
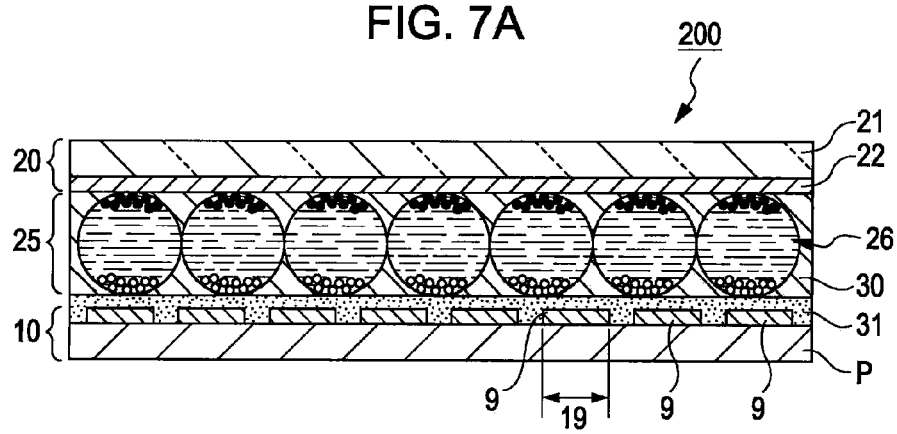
FIG. 7A illustrates an example of the configuration of an electro-optical device.

FIG. 7A is a cross sectional view illustrating an electrophoretic display device as an example of an electro-optical device according to the embodiment of the invention.

In an electrophoretic display device 200, an electrophoretic device 25 is disposed between the active matrix substrate 10 of the above embodiment and a counter substrate 20.

The counter substrate 20 includes a transparent substrate 21 composed of glass and a plastic material and includes a common electrode 22 which is disposed on the transparent substrate 21 and which is composed of a transparent conductive film made from, for example, an ITO. The electrophoretic device 25 has the planar arrangement of multiple microcapsules 26 on the common electrode 22 and has binder 30 that fixes the microcapsules 26 onto the common electrode 22. For example, white particles, black particles, and dispersion medium are encapsulated inside a spherical wall film of the microcapsule 26. The electrophoretic device 25 and the active matrix substrate 10 are adhered to each other with interposing an adhesion layer 31 therebetween.

Typically, the electrophoretic device 25 is preliminarily disposed on the counter substrate 20 to be used as an electrophoretic sheet including the adhesion layer 31. In manufacturing processes, the electrophoretic sheet is used while a protective release sheet is applied to a surface of the adhesion layer 31. The electrophoretic sheet from which the release sheet is separated is adhered to the active matrix substrate 10 which is separately manufactured, so that a display section is produced. Consequently, the adhesion layer 31 exists only on a side of the pixel electrode 9.

In the electrophoretic display device 200 of the embodiment, because the previously described active matrix substrate 10 is used as the device substrate thereof, the entrance of light into the protection circuits 71 to 78 from a side of the counter substrate 20 is capable of being precluded, so that leakage current due to the entrance of the light is suppressed. Consequently, an electrophoretic display device with low power consumption and high display quality is produced.

Especially, as in the embodiment, in cases where the counter substrate 20, the electrophoretic device 25, and the adhesion layer 31 are used as an electrophoretic sheet, a black matrix is not typically formed on the counter substrate 20. Because the light-shielding configuration of each of the protection circuits 71 to 78 is provided on the substrate P, the active matrix substrate 10 according to the embodiment of the invention is preferably used in combination with such a counter substrate 20.

Organic EL Device

Figure 7B:
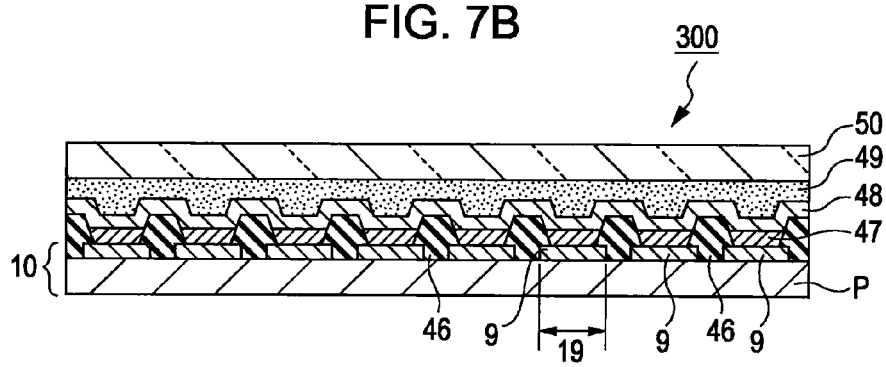
FIG. 7B illustrates another example of the configuration of the electro-optical device.

FIG. 7B is a cross sectional view illustrating an organic EL device as an example of an electro-optical device according to the embodiment of the invention. An organic EL device 300 includes the active matrix substrate 10 of the previously described embodiment, a dividing wall 46 that defines a region for each of the pixel electrodes 9 on the substrate 10, an organic functional layer 47 provided in a region on the pixel electrode 9 surrounded by the dividing walls 46, a common electrode 48 provided so as to cover the organic functional layer 47 and the dividing wall 46, an adhesion layer 49, and a sealing substrate 50.

The dividing wall 46 is composed of an inorganic insulating film, an organic insulating film, or a laminate of such organic and inorganic films and has a function that separates each of the organic functional layers 47 disposed on the pixel electrode 9. Examples of the organic insulating film may include a photocurable acrylic resin and a polymid resin. Examples of the inorganic insulating film may include a silicon oxide and a silicon nitride.

The organic functional layer 47 includes at least an organic emitting layer and typically has a configuration in which a hole injecting layer and the organic emitting layer are laminated in sequence beginning with a side of the pixel electrode 9. For example, a conductive polymer composition, such as poly (3,4-ethylenedioxythiophene)-poly (styrenesulfonate) (PEDOT/PSS), may be used as a material of the hole injection layer. The organic light-emitting layer is formed so as to be capable of emitting each of red, green, and blue light on the basis of individual materials corresponding to each color of the light. The three-color light including red, green, and blue forms one pixel in full color display.

A hole transport layer may be provided between the hole injection layer and the organic emitting layer.

The common electrode 48 is provided so as to cover a plurality of the organic functional layers 47 and has a configuration in which a cathode layer and a resonant layer are laminated, for example.

The cathode layer is formed by using a material with a low work function (for example, 5 eV or lower). Examples of such a material may include calcium, magnesium, sodium, strontium, barium, lithium, or a compound thereof including, for example, a metallic fluoride such as calcium fluoride, a metallic oxide such as a lithium oxide, or an organometallic complex such as calcium acetylacetonate.

The resonant layer is composed of a metallic material and, for example, may be composed of a film in which both of magnesium and silver are deposited. A volume ratio between the magnesium and the silver to be deposited is 10:1, for example. The resonant layer functions as a semi-permeable layer, which reflects part of light emitted from the organic functional layer 47 and permits the passage of the residual part of the light. The resonant layer forms an optically resonant structure in which light is resonated between the resonant layer and the reflecting electrode 90 (see FIG. 5) disposed above the active matrix substrate 10. The only light that satisfies resonant conditions responding to an optical distance between the reflecting electrode 90 and the resonant layer is amplified to be drawn.

The adhesion layer 49 is composed of a transparent resin such as an epoxy resin and has a function to adhere the sealing substrate 50 being a transparent substrate composed of glass or a plastic material to the active matrix substrate 10 and has a function to prevent the entrance of water or the like into the organic functional layer 47. In addition, an inorganic insulating film composed of a silicon oxide, a silicon nitride, or a silicon oxynitride may be provided between the common electrode 48 and the adhesion layer 49.

In the organic EL device 300 of the embodiment, because the active matrix substrate 10 of the previously described embodiment is used as a device substrate thereof, the entrance of light into the protection circuits 71 to 78 from a side of the sealing substrate 50 is capable of being precluded. Consequently, leakage current due to the entrance of light is suppressed, leading to producing an organic EL device with low power consumption and high display quality.

Because a black matrix is not typically formed on the sealing substrate 50, the active matrix substrate 10 according to the embodiment of the invention is preferably used, the substrate 10 having a light shielding configuration of each of the protection circuits 71 to 78 on a substrate P.

Liquid Crystal Device

Figure 7C:
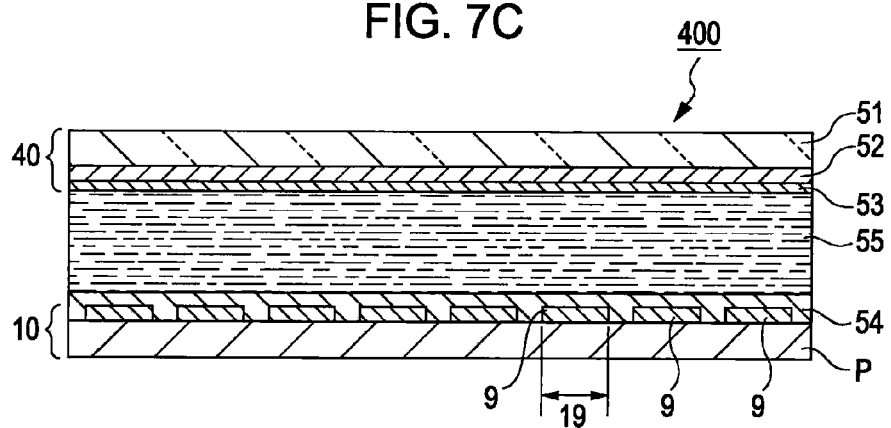
FIG. 7C illustrates another example of the configuration of the electro-optical device.

FIG. 7C is a cross sectional view illustrating a liquid crystal display device as an example of an electro-optical device according to the embodiment of the invention.

A liquid crystal device 400 includes an active matrix substrate 10 of the previously described embodiment, counter substrate 40, and a liquid crystal layer 55 disposed therebetween.

The counter substrate 40 has a transparent substrate 51 composed of glass or a plastic material, a common electrode 52 disposed on the transparent substrate 51 on a side of the liquid crystal layer 55, and an oriented film 53 disposed on the common electrode 52. An oriented film 54 is disposed on the active matrix substrate 10 so as to cover the pixel electrodes 9.

An suitable configuration in well known active matrix liquid crystal devices is capable of being applied to the liquid crystal device of the embodiment. For example, various known configuration such as a twisted nematic (TN) type, a vertically aligned nematic (VAN) type, a super twisted nematic (STN) type, a ferroelectric type, and an anti-ferroelectric type may be employed in terms of orientation of liquid crystal. A color filter may be disposed on any of the active matrix substrate 10 and the counter substrate 40 for the purpose of color display. Furthermore, a reflecting film may be disposed on the active matrix substrate 10 to produce a reflective liquid crystal device. A light transmissive portion such as an opening and a slit may be formed on the reflecting film to produce a semi-transmissive and reflective liquid crystal device.

In the liquid crystal device 400, because the active matrix substrate 10 of the previously described embodiment is used as a device substrate thereof, the entrance of light into the protection circuits 71 to 78 from a side of the counter substrate 40 is capable of being precluded. Consequently, leakage current due to the entrance of light is suppressed, leading to producing an organic EL device with low power consumption and high display quality.

Electronic Apparatus

An example will be hereinafter described, in which each of the electro-optical devices (the electrophoretic display device 200, the organic EL device 300, and the liquid crystal device 400) according to the above described embodiments is applied to an electronic apparatus.

Figure 8:
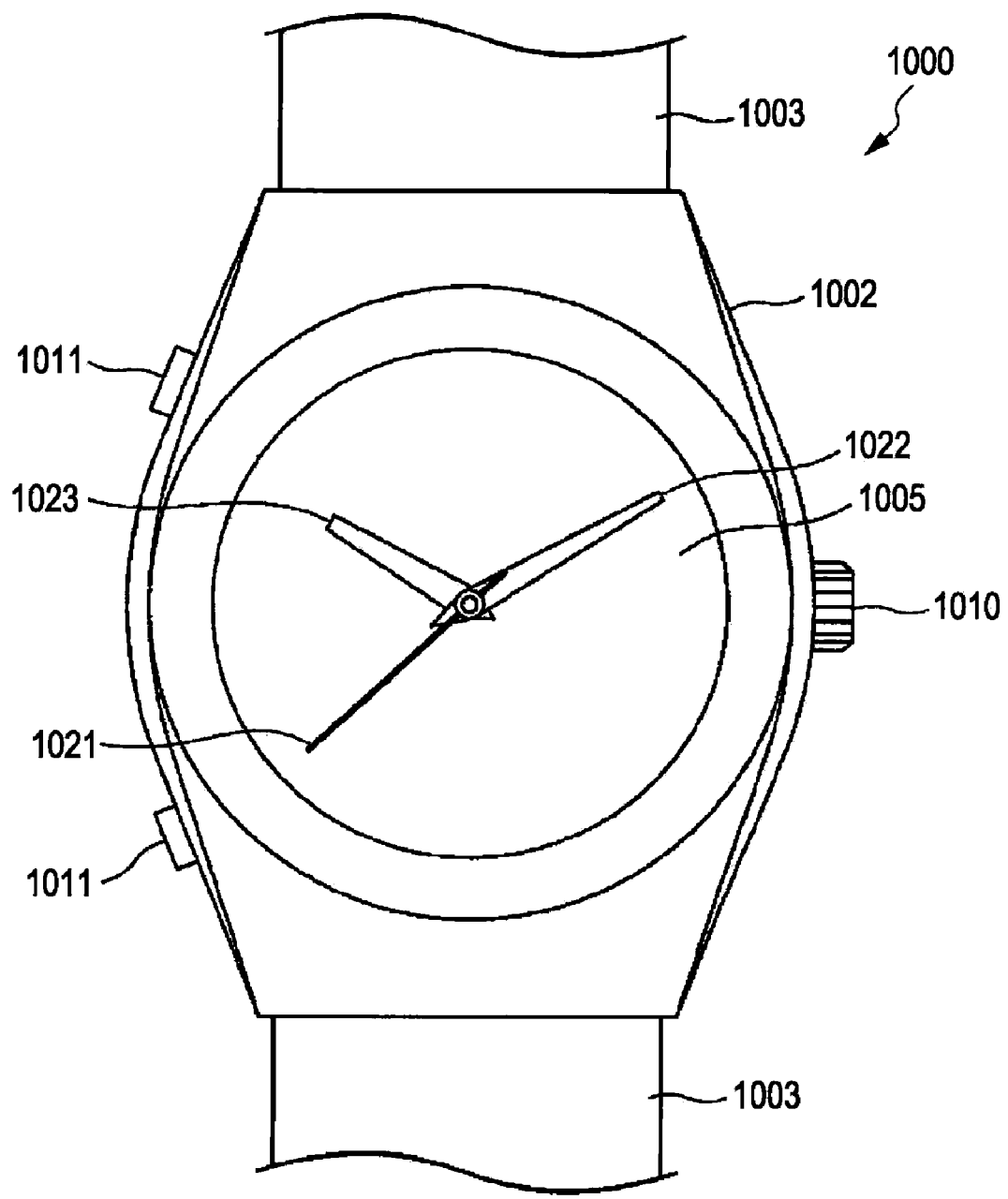
FIG. 8 illustrates an example of an electronic apparatus.

FIG. 8 is an elevation view illustrating a watch 1000. The watch 1000 includes a watch case 1002 and a pair of bands 1003 connected to the watch case 1002.

The watch case 1002 has a display 1005 including an electro-optical device according to the above described embodiments, a second hand 1021, a minute hand 1022, and an hour hand 1023, each being provided on a front side of the case 1002. The watch case 1002 has a winder 1010 as an operator on one side of the case 1002 and has an operation button 1011 on another side thereof. The winder 1010 is connected to a setting stem (not illustrated) inside the case 1002 and is provided so as to be capable of being pushed and pulled in multiple stages (for example, two stages) and of being rotated while being integrated with the setting stem. The display 1005 is capable of displaying an image as a back ground, a character string such as data or time, a second hand, a minute hand, or an hour hand thereon.

Figure 9:
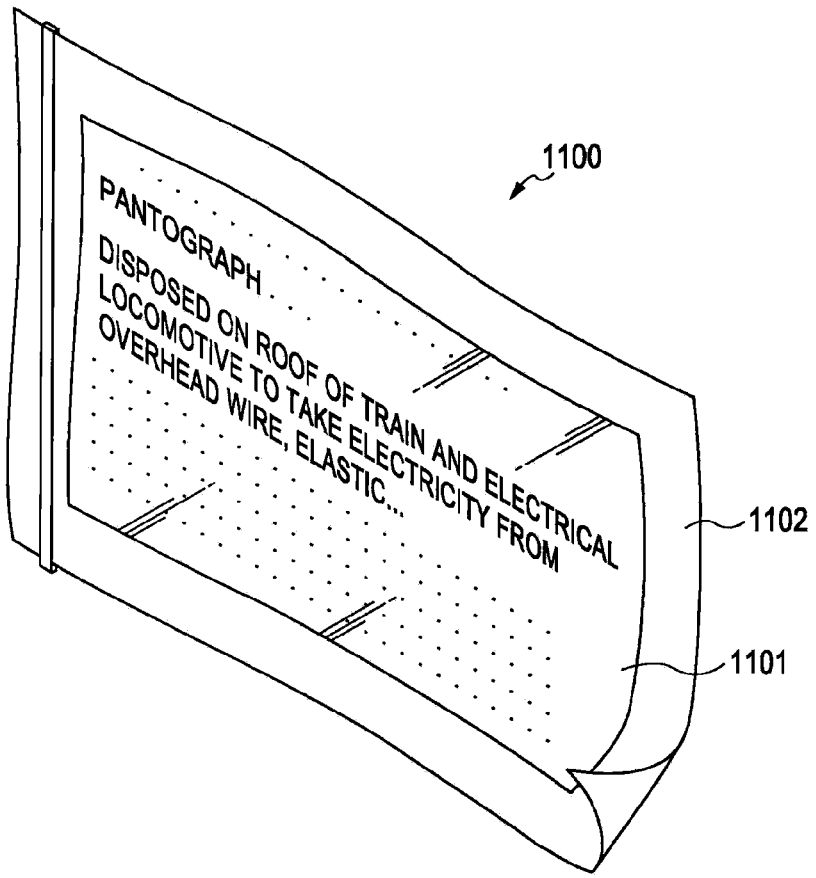
FIG. 9 illustrates another example of the electronic apparatus.

FIG. 9 is a perspective view illustrating the configuration of electronic paper 1100. The electronic paper 1100 includes an electro-optical device according to the above described embodiments in a display region 1101. The electronic paper 1100 has flexibility and includes a body 1102 which is a rewritable sheet having texture and flexibility same as those of ordinary paper.

Figure 10:
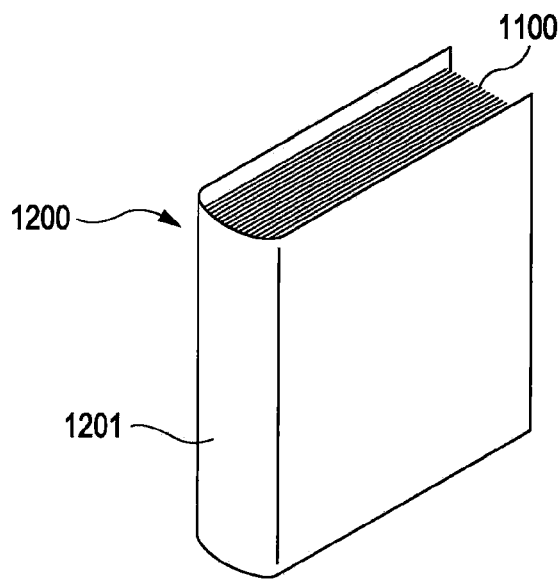
FIG. 10 illustrates another example of the electronic apparatus.

FIG. 10 is a perspective view illustrating the configuration of an electronic notebook 1200. In the electronic notebook 1200, a plurality of the electronic paper 1100 are stacked and covered with a cover 1201. For example, the cover 1201 is provided with a display data input unit (not shown) with which display data transmitted from an external device is input. Consequently, display contents are capable of being changed in accordance with such display data while leaving the electronic paper being stacked.

Because each of the electro-optical devices according to the embodiments of the invention is applied to the watch 1000, the electronic paper 1100, and the electronic notebook 1200, there is provided an electronic apparatus having a display section with excellent operation reliability and high display quality.

Each of the above electronic apparatus is an example of the invention and does not limit the scope of the invention. For example, each of the electro-optical devices according to the embodiments of the invention is capable of preferably being applied to a display section of an electronic apparatus such as a mobile phone or a portable audio visual apparatus.

The entire disclosure of Japanese Patent Application No. 2009-175658, filed Jul. 28, 2009 is expressly incorporated by reference herein.

What is claimed is:

1. An active matrix substrate comprising:
    a substrate;
    a display section having a pixel circuit formed on the substrate; and
    a protection circuit connected to an interconnection of the display section,
    wherein the protection circuit has a diode-connected transistor, an insulating layer provided so as to cover the transistor, and a light-shielding layer provided in a region above the insulating layer so as to face at least a channel region in the transistor and electrically connected to at least any one of a gate electrode and a source electrode of the transistor, and
    wherein the light-shielding layer has an extension portion that extends outward from the transistor, and the extension portion forms a capacitive device along with a conductive member connected to at least any one of the gate electrode and the source electrode of the transistor and with the insulating layer.

2. The active matrix substrate according to claim 1, wherein the light-shielding layer is composed of a light reflective metallic film, and the metallic film is connected to any one of the gate electrode and the source electrode through a transparent conductive layer laminated on the metallic film.

3. The active matrix substrate according to claim 1, wherein the transistor has an inversely staggered configuration, and the insulating layer includes an organic insulating film at least above the channel region.

4. The active matrix substrate according to claim 3, wherein the insulating layer above the channel region has a laminate structure including inorganic and organic insulating films, whereas the insulating layer in the region provided with the extension portion is composed of an only inorganic insulating film.

5. An active matrix substrate comprising:
   a substrate;
   a display section having a pixel circuit formed on the substrate; and
   a protection circuit connected to an interconnection of the display section,
   wherein the protection circuit has a diode-connected transistor, an insulating layer provided so as to cover the transistor, and a light-shielding layer provided in a region above the insulating layer so as to face at least a channel region in the transistor and electrically connected to at least any one of a gate electrode and a source electrode of the transistor, and
   wherein the protection circuit is provided with a capacitive device having a first electrode connected to the gate electrode of the transistor, a second electrode connected to the source electrode of the transistor, and an insulating film formed by extending a gate insulating film of the transistor.

6. An electro-optical device comprising the active matrix substrate according to claim 1.

7. An electronic apparatus comprising the electro-optical device according to claim 6.

* * * * *